United States Patent [19]
Estrada

[11] Patent Number: 5,006,026
[45] Date of Patent: Apr. 9, 1991

[54] PARTICLE RETENTION MEANS ASSOCIATED WITH FASTENER

[76] Inventor: Carlos I. Estrada, 3143 Commonwealth Ave., Alhambra, Calif. 91803

[21] Appl. No.: 532,898

[22] Filed: Jun. 4, 1990

[51] Int. Cl.⁵ .................. F16B 33/00; F16B 43/02
[52] U.S. Cl. .................. 411/369; 411/542; 411/907; 411/915
[58] Field of Search .......... 411/10, 11, 369, 542, 411/544, 907, 908, 915; 285/212, 220, 355, 918

[56] References Cited

U.S. PATENT DOCUMENTS

| | | |
|---|---|---|
| 2,752,814 | 7/1956 | Iaia . |
| 3,173,712 | 3/1965 | Zahuranec et al. .......... 285/355 |
| 3,175,454 | 3/1965 | Morse . |
| 3,399,589 | 9/1968 | Breed . |
| 3,863,963 | 2/1975 | Hershey .......... 285/355 |
| 4,026,183 | 5/1977 | Bart .......... 411/915 |
| 4,310,273 | 1/1982 | Kirrish .......... 411/907 |
| 4,312,616 | 1/1982 | Waller et al. .......... 411/387 |
| 4,701,088 | 10/1987 | Crull .......... 411/369 |

FOREIGN PATENT DOCUMENTS 706688 6/1931 France .......... 285/220

*Primary Examiner*—Neill R. Wilson
*Attorney, Agent, or Firm*—William W. Haefliger

[57] ABSTRACT

An apparatus to collect metal particles as generated (galling) by a fastener connection to a workpiece, the fastener having a head and an axially forwardly extending shank, the combination comprising an O-ring about the head; the head forming an outwardly open annular recess spaced from the shank to receive the bulk of the O-ring; the O-ring projecting from the recess to engage the workpiece and form with the head a recess portion to receive and retain the particles.

10 Claims, 1 Drawing Sheet

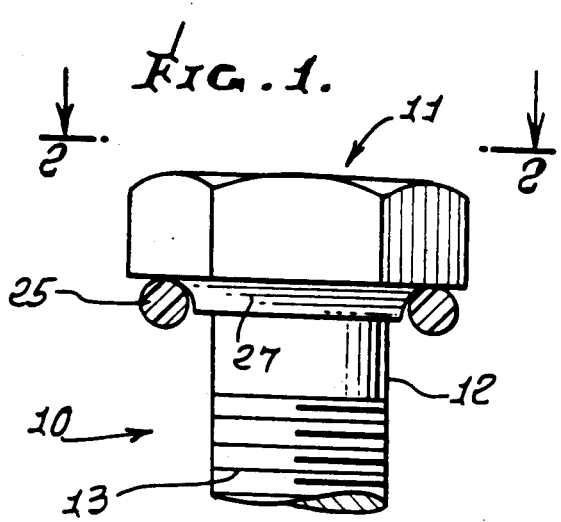
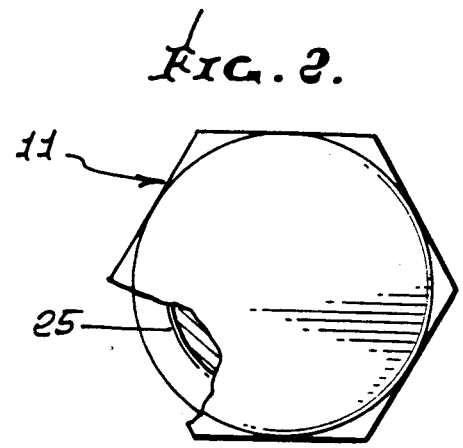
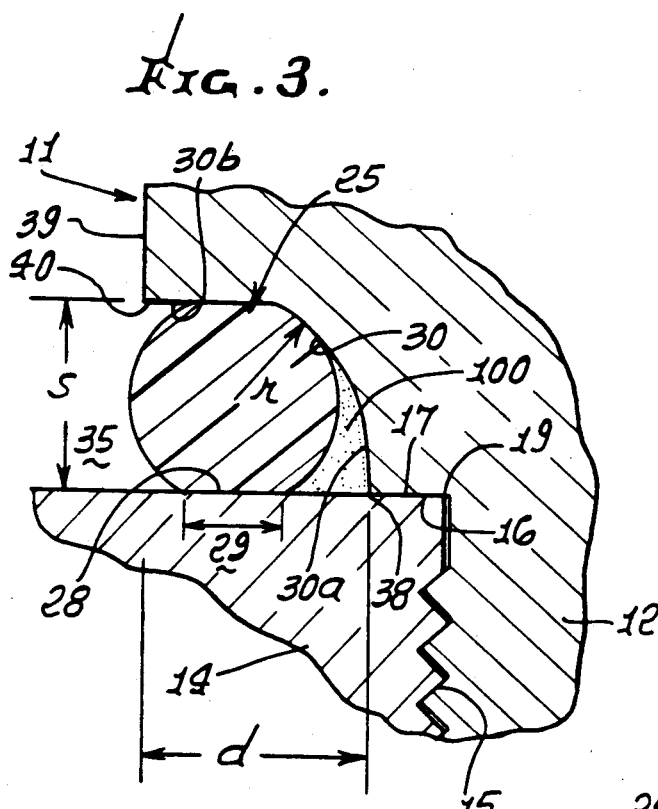
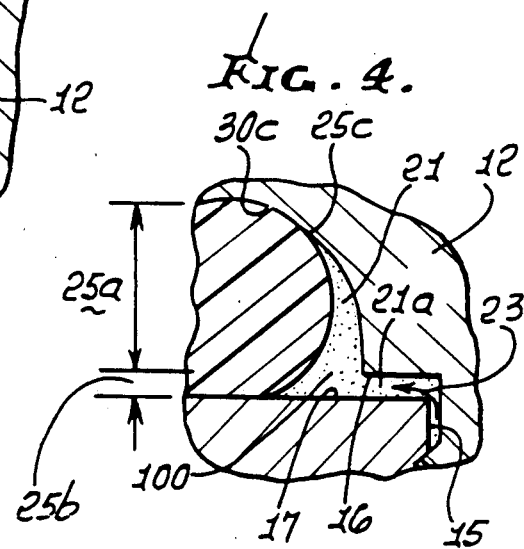

PARTICLE RETENTION MEANS ASSOCIATED WITH FASTENER

BACKGROUND OF THE INVENTION

This invention relates generally to fasteners, and more particularly to improvements in fasteners which result in retention of work chips or particles formed during fastener installation in workpiece or generated while in use.

In many work environments, there is a need to maintain extremely clean conditions, that is, free of metal particles that could contaminate workpieces or equipment. For example, in electronic assemblies, it is necessary to prevent electrical shorts, as could otherwise be caused by tiny metal particles that may be generated during equipment life or produced during fastener installation. In this regard, it is found that screwing or tightening of metal fasteners into workpieces can result in production of tiny metal particles, as from burrs, adjacent the fastener shank or thread, which frictionally rubs against the work.

SUMMARY OF THE INVENTION

It is a major object of the invention to provide means whereby escape of such generated metal particles into the work environment is prevented, without inhibiting the fastening functions of such fasteners.

Basically, the invention has to do with provision of apparatus to collect and retain the particles adjacent a fastener, which typically has a head or a shank. The provided apparatus includes:

(a) an O-ring about the head,
(b) the head forming an annular recess spaced from the shank to receive the bulk of the O-ring,
(c) the O-ring projecting from the recess to engage the workpiece and form with the head a recess portion to receive and retain the particles.

As will be seen, the recess typically opens radially outwardly of the head, and also toward the workpiece; and the head has an annular seat radially inwardly of the O-ring for engaging a surface of the workpiece about which the O-ring extends. Also, the recess typically intersects the seat inward of the O-ring in all conditions of O-ring compression, whereby integrity of the particle-collecting recess, and its function, are maintained.

Further, the head, adjacent the recess, typically has a wall which has an annularly concave portion engaging the O-ring, and a wall portion spaced from the O-ring to extend toward the seat, the recess formed between the wall portion and the O-ring. A second wall portion of the head typically extends radially outwardly toward the periphery of the head at a locus which is rearwardly spaced from a plane defined by the seat.

These and other objects and advantages of the invention, as well as the details of an illustrative embodiment, will be more fully understood from the following specification and drawings, in which:

DRAWING DESCRIPTION

FIG. 1 is a section taken through a fastener embodying the invention;

FIG. 2 is a top plan view on lines 2—2 of FIG. 1;

FIG. 3 is an enlarged view of the O-ring after fastener tightening; and

FIG. 4 is a view like FIG. 3 prior to completion of fastener tightening.

DETAILED DESCRIPTION

In the drawings, a fastener 10 has a head 11 and a shank 12, the latter for example being externally threaded at 13, for connection to a workpiece 14 at bore 15. The head may be hexagonal as shown. The fastener may alternatively define a bolt with an unthreaded shank near its head, but with a threaded end portion for reception of a nut. The head 11 has an annular seating end portion 16, which extends about the shank near its connection to the head, and which seats against the surface 17 of the workpiece at annular locus 19. While the fastener is being connected to the workpiece, and head end portion 16 is spaced from the work, metal particles 100 generated by such connection may pass from the clearances 23 between the metallic shank 12 and the workpiece bore 15, and collect at zones 21 and/or 21a. See arrow 23 in FIG. 4.

In accordance with the invention, an annular seal such as O-ring 25 is provided to extend about the head extent 26 closest the shank, but spaced radially from that head extent, as well as from the annular seating end portion 16. The head forms an annular recess or groove 27 spaced radially from the shank, and sunk into the body of the head, to receive the bulk 25a of the O-ring 25; and in this regard, a portion 25b of the O-ring projects axially forwardly from the recess 27, as seen in FIG. 4. When the head is tightened against the workpiece, the forward portion 25b of the O-ring engages the work at 28 and is displaced relatively rearwardly back into the recess, whereby the O-ring is compressed and seals off against the work at annular zone 29. The axial dimension of portion 25b is about $0.20 \times 2$ r.

It will be noted that recess 27 opens radially outwardly of the head, and also opens forwardly toward the workpiece. The overall radial dimension "d" of the recess, and the concave curvature of the recess wall at 30, are such that annular recess zone or portion 21 is formed between wall 30c and the convex surface 25c of the O-ring or seal, and any metal particles 100 tend to collect in that zone, as referred to above. Larger particles trapped in zone 21a between the seat 16 and the work surface 17 may prevent complete annular seating of 16 against 17, in which event smaller particles may pass between 16 and 17, but such smaller particles are then trapped in zone or recess space 21 by the compressed O-ring 25, as seen in FIG. 3. This assures and prevents escape of the particles into the outer environment indicated at 35, which is important where very clean conditions are to be maintained, as for example in certain electronic assemblies.

Typically, concave surface or wall 30 has the same or approximately the same radius as the radius "r" of the O-ring 25 at their zones of engagement in axial radial planes. Wall 30 has portion 30a that extends forwardly to intersect 16 at annular locus 38, and a portion 30b that extends radially outwardly to intersect the side wall 39 of the head at flattened annular locus 40. That locus is spaced rearwardly from a plane defined by the seat 16, and allows radially outward expansion of the O-ring as in FIG. 3.

Recess zone 21 tapers rearwardly, as defined by unengaged recess wall portion 30a and the outer surface at 25c of the O-ring, with curvature as shown to collect the metal particles away from the zone 29 of interengagement of the O-ring and surface 17. Compression of the O-ring between 28 and 30b is predetermined and fixed by the engagement of surfaces 16 and 17, the spacing between surface 28 and 30b indicated at "s", where 1½ r<s<2 r, for best results.

The O-ring may consist of hard material, such as DuPont VESPEL, or of relatively hard organic material, these being examples. The percent deformation of the O-ring in FIG. 3 is preferably quite small, i.e., 5 to 10 percent.

The invention is also applicable to a capped nut. Washers, of lock or flat type, may be used, and may be considered as part of the work.

I claim:

1. In apparatus to collect metal particles as generated by a fastener connection to a workpiece, the fastener having a head and an axially forwardly extending shank, the combination comprising
   (a) an O-ring about the head,
   (b) the head forming an outwardly open annular recess spaced from the shank to receive the bulk of the O-ring,
   (c) the O-ring projecting from the recess to engage the workpiece and form with the head a recess portion to receive and retain the particles,
   (d) said recess opening radially outwardly of the head, and also toward the workpiece, to allow radially outward deformation of the O-ring away from said particle collecting recess portion.

2. The combination of claim 1 including the workpiece engaged by the O-ring.

3. The combination of claim 1 wherein the head has an annular seat radially inwardly of the O-ring for engaging a surface of the workpiece about which the O-ring extends.

4. The combination of claim 3 wherein the recess intersects said seat, said recess portion formed between the O-ring and the work engaging seat.

5. The combination of claim 3 wherein the head, adjacent the annular recess, has a wall which has an annularly concave portion engaging the O-ring, and a wall portion spaced from the O-ring to extend toward said seat, said recess formed between said wall portion and said O-ring.

6. The combination of claim 3 wherein the head has a wall having an annularly concave portion engaging the O-ring, and a second wall portion which extends radially outwardly toward the periphery of the head at a locus which is rearwardly spaced from a plane defined by said seat.

7. The combination of claim 3 including said workpiece, the head and workpiece interengaged to define a pre-set axial dimension of said recess corresponding to predetermined axial compression of the O-ring.

8. The combination of claim 3 including said workpiece, the head and workpiece interengaged to define a pre-set axial dimension of said recess corresponding to predetermined axial compression of the O-ring.

9. The combination of claim 1 wherein the O-ring consists of one of the following:
   (a) hard, synthetic resinous material
   (b) hard organic material.

10. The combination of claim 3 wherein in uncompressed condition, the O-ring projects forwardly of a plane defined by said seat, to an extent equal to about $0.20 \times 2r$ where r=radius of the O-ring cross section in an axial radial plane.

* * * * *